(12) United States Patent
Wu et al.

(10) Patent No.: US 7,738,511 B2
(45) Date of Patent: Jun. 15, 2010

(54) APPARATUS AND METHOD FOR TRANSMITTING A DS3 SIGNAL OVER MULTIPLE TWISTED PAIR CONDUCTORS

(75) Inventors: Zhangyi Wu, Rockville, MD (US); Gary Michael Miller, Kearneysville, WV (US); James Edward Sclater, Annandale, VA (US); Filiz Taskin, Istanbul (TR); David Owen Corp, Clifton, VA (US)

(73) Assignee: Hubbell Incorporated, Orange, CT (US)

( * ) Notice: Subject to any disclaimer, the term of this patent is extended or adjusted under 35 U.S.C. 154(b) by 1876 days.

(21) Appl. No.: 10/617,363

(22) Filed: Jul. 11, 2003

(65) Prior Publication Data

US 2005/0008041 A1 Jan. 13, 2005

(51) Int. Cl.
*H04J 3/04* (2006.01)
(52) U.S. Cl. .................. 370/536; 370/535; 370/249
(58) Field of Classification Search .................. 370/536
See application file for complete search history.

(56) References Cited

U.S. PATENT DOCUMENTS

| | | | | |
|---|---|---|---|---|
| 3,692,964 | A * | 9/1972 | Camiciottoli et al. | 375/211 |
| 5,060,226 | A * | 10/1991 | Gewin et al. | 370/244 |
| 5,437,023 | A * | 7/1995 | Sheets et al. | 379/22.08 |
| 5,608,733 | A * | 3/1997 | Vallee et al. | 370/394 |
| 6,275,510 | B1 * | 8/2001 | Koenig et al. | 370/535 |
| 6,657,953 | B1 * | 12/2003 | Hiramoto et al. | 370/224 |
| 6,775,305 | B1 * | 8/2004 | Delvaux | 370/535 |
| 6,928,056 | B2 * | 8/2005 | Evans | 370/244 |
| 6,967,589 | B1 * | 11/2005 | Peters | 340/854.6 |
| 7,006,500 | B1 * | 2/2006 | Pedersen et al. | 370/394 |
| 7,054,376 | B1 * | 5/2006 | Rubinstain et al. | 375/261 |
| 7,058,011 | B1 * | 6/2006 | Stearns et al. | 370/219 |
| 7,065,104 | B1 * | 6/2006 | Seren et al. | 370/536 |
| 7,230,977 | B1 * | 6/2007 | Somekh et al. | 375/211 |
| 2001/0008534 | A1 | 7/2001 | Depue | |

(Continued)

OTHER PUBLICATIONS

Sklower et al., The PPP Multilink Protocol, Aug. 1996, Network Working Group, Request for Comments: 1990.*

(Continued)

*Primary Examiner*—Rafael Pérez-Gutiérrez
*Assistant Examiner*—German Viana Di Prisco
(74) *Attorney, Agent, or Firm*—Stacey J. Longanecker; Mark S. Bicks; Alfred N. Goodman

(57) ABSTRACT

A system and method for transmitting DS3 signals over long distances over a plurality of twisted pair conductors is provided. A DS3 interface is provided. The DS3 signal is inversely multiplexed into a plurality of data streams. Overhead is added to the data streams to generate packets having stream identifiers and packet number identifiers. At the receive end, received packets are synchronized using the stream and packet number identifiers, and multiplexed back into a DS3 signal. Systems according to embodiments of the invention are compatible with existing loopback codes, passing through a first loopback code received, and optionally entering a loopback mode where more than one loopback code is received consecutively without an intervening loop down code being received. The incorporated technology permits very small packaging and thereby permits use in small outdoor enclosures. Connection interfaces adapt automatically to the application and provide further conveniences for use in telephone company outdoor cabinets.

33 Claims, 7 Drawing Sheets

U.S. PATENT DOCUMENTS

| | | | |
|---|---|---|---|
| 2001/0028644 A1 | 10/2001 | Barzegar et al. | |
| 2001/0040042 A1 | 11/2001 | Stipes | |
| 2002/0007490 A1 | 1/2002 | Jeffery | |
| 2002/0018491 A1 | 2/2002 | Balatoni | |
| 2002/0027876 A1 | 3/2002 | Barzegar et al. | |
| 2002/0027927 A1 | 3/2002 | Barzegar et al. | |
| 2002/0039359 A1 | 4/2002 | Gerszberg et al. | |
| 2002/0044597 A1 | 4/2002 | Shively et al. | |
| 2002/0056137 A1 | 5/2002 | Stewart et al. | |
| 2002/0080825 A1* | 6/2002 | Wolf et al. | 370/517 |
| 2002/0080933 A1 | 6/2002 | Hansen | |
| 2002/0097105 A1 | 7/2002 | Khemakhem et al. | |
| 2002/0167970 A1 | 11/2002 | Starr | |
| 2002/0176139 A1* | 11/2002 | Slaughter et al. | 359/172 |
| 2003/0012362 A1 | 1/2003 | Khemakhem et al. | |
| 2003/0097624 A1* | 5/2003 | Barton et al. | 714/704 |
| 2003/0107999 A1* | 6/2003 | Peleg et al. | 370/252 |
| 2003/0142759 A1 | 7/2003 | Anderson et al. | |
| 2003/0169780 A1* | 9/2003 | Kukic | 370/535 |
| 2004/0179486 A1* | 9/2004 | Agarwal et al. | 370/316 |
| 2005/0220180 A1* | 10/2005 | Barlev et al. | 375/222 |
| 2008/0095191 A1* | 4/2008 | Knapp et al. | 370/470 |

OTHER PUBLICATIONS

ADC Telecommunications "A": ADC Telecommunications, DS3/STS1 PBOR Installation Dwg, Rev B, Jul. 23, 1998.*

ADC Telecommunications "B": ADC Telecommunications, DS3/STS-1 Repeater Products, Sep. 2000.*

ADC Telecommunications "C": ADC Telecommunications, Installation Dwg 16 Pos Chassis, Rev C, Jan. 4, 2002.*

ADC Telecommunications "A": ADC Telecommunications, DS3/STS1 PBOR Installation Dwg, Rev B, Jul. 23, 1998.*

ADC Telecommunications "B": ADC Telecommunications, DS3/STS-1 Repeater Products, Sep. 2000.*

ADC Telecommunications "C": ADC Telecommunications, Installation Dwg 16 Pos Chassis, Rev C, Jan. 4, 2002.*

* cited by examiner

APPARATUS AND METHOD FOR TRANSMITTING A DS3 SIGNAL OVER MULTIPLE TWISTED PAIR CONDUCTORS

FIELD OF THE INVENTION

The present invention relates to communication systems. In particular, the present invention relates to an apparatus and method for transmitting high speed data signals, such as DS3 signals, over multiple twisted pair conductors.

BACKGROUND OF THE INVENTION

DS3 is a high speed data transport format which has been defined and used internally by the U.S. phone companies for many years. Recently, the need for high speed service to businesses has increased the demand for DS3 service, but in many cases the service cannot be delivered. DS3 signals are carried over coaxial cable, but have a range of only 450 feet, and the interface is only suitable for indoor use. Typically, the solution is to multiplex the DS3 onto a fiber optic signal and install fiber in the ground to provide service. However, the fiber optic equipment is expensive and the fiber installation is very expensive. Unless these expenses are justified, and the rights to install the cable are available, DS3 service has not been available.

At present, there are three ways to deliver a DS3 to a business. First, the DS3 can be multiplexed into a Synchronous Optical Network (SONET) stream, typically at the OC3 rate of 155.52 Mbps. The equipment to perform this function is typically very expensive and ⅔rds of the bandwidth is wasted if only one DS3 is needed. Second, the DS3 can be divided into 28 DS1 signals with a rate of 1.544 Mbps each. The DS1s are hardened for outdoor application and have a reach of 6000 feet. Repeaters are readily available to extend the reach. However, this solution requires 56 twisted pairs, and furthermore not all DS3 signals are formatted in a way which allows them to be broken into DS1s. Finally, devices are known which can carry a DS3 over copper pairs, but these require up to 22 pairs. In addition, these devices are physically large, and require more power than embodiments of the present invention. Also, these devices are incapable of transmitting high speed data, such as a DS3 data stream, over a small number of twisted pair conductors.

SUMMARY OF THE INVENTION

The above disadvantages are avoided and other advantages are realized in a system and method according to the present invention. In a system according to an embodiment of the invention, high speed digital signals are received and header information is analyzed. The high speed digital signal is preferably multiplexed into four digital signals having numbered packets, and modulated onto separate twisted pair conductors and transmitted to a receiving end. Transmit signals and receive signals are separated into respective high and low frequency bands. At a receiving end, four signals are received, and demultiplexed back to a high speed digital signal using the numbered packet information. Loopback is available to diagnose circuit operation. If a single loopback code is identified within the high speed digital signal header, it is passed along. However, if multiple loopback codes are identified without an intermittent loop down code, then the system enters a loopback mode. The technology permits DS3 transmission over four standard twisted pairs at distances that are at least five times greater than the 450 foot coaxial cable DS3 distance limitation. One or more repeaters may be used to achieve even greater transmission distances. Thus, embodiments of the present invention are able to carry DS3 data traffic into businesses without the expense of installing optical fiber, and using fewer twisted pair than existing solutions.

BRIEF DESCRIPTION OF THE DRAWINGS

The invention will be more readily understood with reference to the embodiments thereof illustrated in the attached drawing figures, in which.

In the drawing figures, it will be understood that like numerals refer to like features and structures.

DETAILED DESCRIPTION OF THE PREFERRED EMBODIMENTS

DS3 is a 44.736 Mbps data stream which can be transported up to 450 feet over coaxial cable. The interface is not sufficiently hardened to allow the cable to be buried or hung on poles. However, the interface will only operate reliably within a building or within a metal enclosure. Transporting a DS3 signal between buildings requires either microwave radios, translation to fiber optic medium, or line-of-sight free air optics equipment. Radios and free air optics equipment are expensive, may be disrupted by adverse weather conditions and are suitable only when line-of-sight connections can be established between two locations. If fiber optic cable is not already installed, the expense of installation can be prohibitive, and the fiber optic termination equipment is itself very expensive. Installation of fiber is particularly inefficient where a single OC3 optical signal could carry three DS3 signals, but only a single DS3 is needed. In this case two-thirds ($\frac{2}{3}^{rd}$) of the installed OC3 capacity is wasted as discussed in the background section above. Embodiments of the present invention allow the DS3 to be extended over four ordinary twisted pair conductors up to 2300 feet. Extra twisted pair are usually already installed and readily available, so installation cost is minimized. With repeater(s), the length of the span can be increased as needed. Since a DS3 is typically installed in a redundant configuration, embodiments of the present invention can advantageously accommodate this requirement by doubling the equipment at each end (and doubling intervening repeaters) and using eight twisted pair instead of four.

Embodiments of the present invention provide a means to deliver a DS3 signal using four twisted pair cables up to 2300 feet (without repeaters) and include the necessary hardening for outdoor applications. Each twisted pair will carry 12.96 Mbps of data in both the transmit and receive directions using a modulation scheme designed to minimize interference with other services in adjacent twisted pairs, such as Integrated Services Digital Network (ISDN) or Asymmetric Digital Subscriber Line (ADSL).

Figure 1:
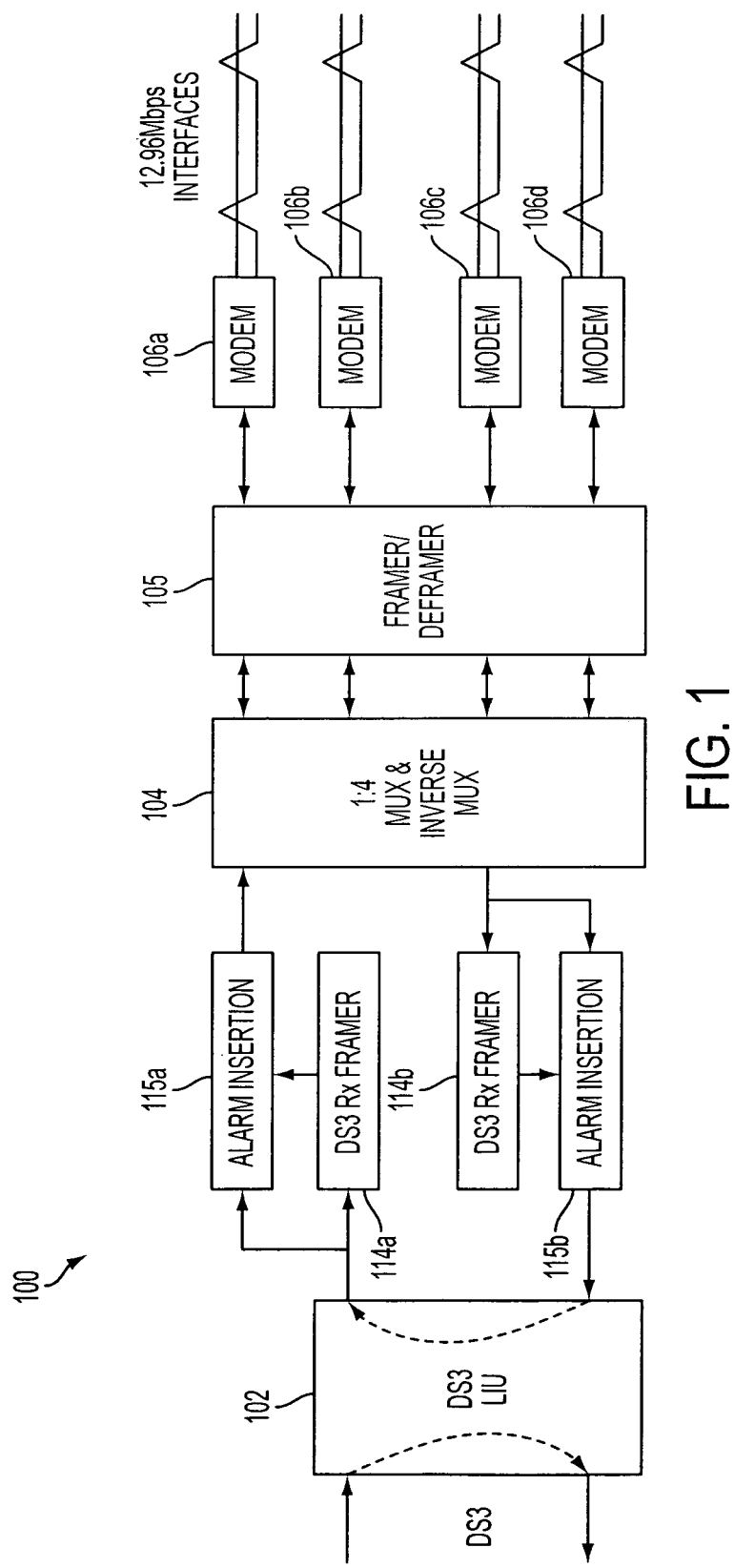
FIG. 1 is a block diagram of a DS3-to-twisted pair unit according to an embodiment of the present invention.

Certain embodiments of the invention will now be described with reference to the attached drawing figures. FIG. 1 is a block diagram of a system according to an embodiment of the present invention. The system 100 is comprised of a DS3 Line Interface Unit (LIU) 102, an inverse multiplexer 104 to split the DS3 signal into four streams with overhead to permit proper reassembly, and four modulators 106a-106d to drive the data onto the twisted pair. In the reverse direction, the twisted pairs feed four demodulators 106a-106d which provide the output to the multiplexer 104 to reassemble the data in the proper order. It will be appreciated by those of skill in the art that the system illustrated in FIG. 1 is shown with various functions, such as multiplexing and inverse multiplexing, combined in one component block. However, separate components could easily be used to perform corresponding functions, such as modulating and demodulating, and so on, without departing from the spirit of the invention.

An identifier is preferably encoded into the streams to allow the system 100 to correct a common wiring error where pairs are swapped. The data on the streams preferably employs Reed Solomon error correction coding and interleaving. Thus, short bursts of errors are spread over many Reed Solomon blocks to improve error correction performance.

In one embodiment of the invention, two types of systems 100 are used at either end of the four twisted pair. These are referred to as the Line Unit and the Remote Unit, corresponding generally to the end of the line closer to the central office (CO), and the end closer to the customer equipment, respectively. The Line Unit and Remote Unit differ in the frequency plan of the modulators. The Line Unit will preferably transmit on a low frequency band and receive on the high frequency band, while the Remote Unit will preferably transmit on the high frequency band and receive on the low frequency band. As a result, a Line Unit will communicate with a Remote Unit at the modem interfaces.

FIG. 1 shows the basic signal flow within embodiments of the present invention. One modem is dedicated to each twisted pair. The DS3 LIU 102 provides the standard interface for the DS3 signal. It is capable of executing a loopback in either direction as indicated by the dashed lines. The received part of the DS3 input is examined for proper framing and any embedded alarm signals. If a problem is detected, the unit may replace the received DS3 with either an IDLE code, an Alarm Indication Signal (AIS), or the unit may not respond depending on switch settings provisioned by the user. The same operation is performed in the transmitted DS3 direction.

The DS3 signal may include a Far End Alarm and Control (FEAC) channel embedded in the overhead. If so, embodiments of the invention can be provisioned to respond to the DS3 loopback and DS3 loop down or Network Interface Unit (NIU) loopback and NIU loop down codes. While this is a normal part of most systems employing DS3 interfaces, embodiments of the present invention advantageously have the ability to handle loopbacks in tandem arrangements which would be typical in redundant installations.

Figure 2:
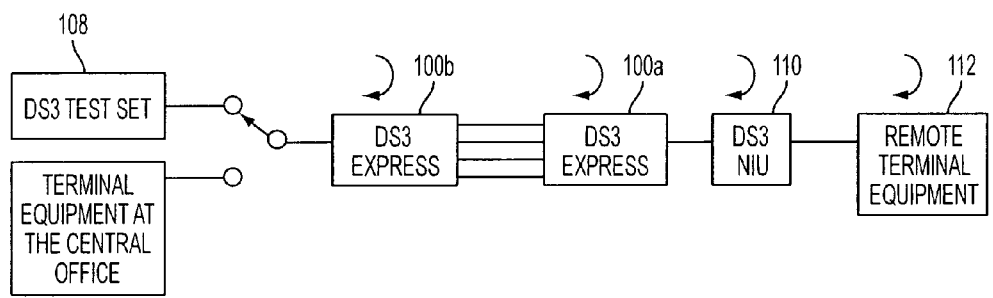
FIG. 2 is a block diagram of a system according to an embodiment of the present invention connected to a DS3 test set to perform a loopback function.

FIG. 2 shows an exemplary application for embodiments of the present invention during a routine test of the system in a representative telephone company application. During the test, the equipment at the central office is replaced by a DS3 Test Set 108 capable of issuing the loopback code. Without an embodiment of the invention in place, the DS3 Network Interface Unit (NIU) 110 would respond to the NIU loopback code and the remote terminal equipment 112 would respond to the DS3 FEAC loopback. If the end unit 100 simply responded to either of the loopback codes, the NIU 110 and/or remote terminal equipment 112 would not be able to respond to that loopback.

Thus, embodiments of the present invention preferably respond to either loopback code as provisioned by the user, but the user must configure the number of times that the loopback code must appear in order for the loopback to be executed by the system 100. In one embodiment, the Remote Unit 100a farthest from the test set will be provisioned to respond to the second loopback command. The first loopback command will normally be reserved for the NIU 110 or terminating equipment 112. The two loopback commands are preferably sent without an intervening loop down command. The Line Unit 100b, closest to the test equipment 108, preferably responds to a third consecutive loopback command without an intervening loop down command.

Of course the numbers of consecutive commands used herein are merely exemplary and illustrative in nature, and it will be understood that any suitable number of loop back commands could be used within the spirit of the present invention. This feature is particularly advantageous due to the fact that most existing DS3 test equipment can easily send multiple copies of the loop commands without an intervening loop down command.

Figure 3:
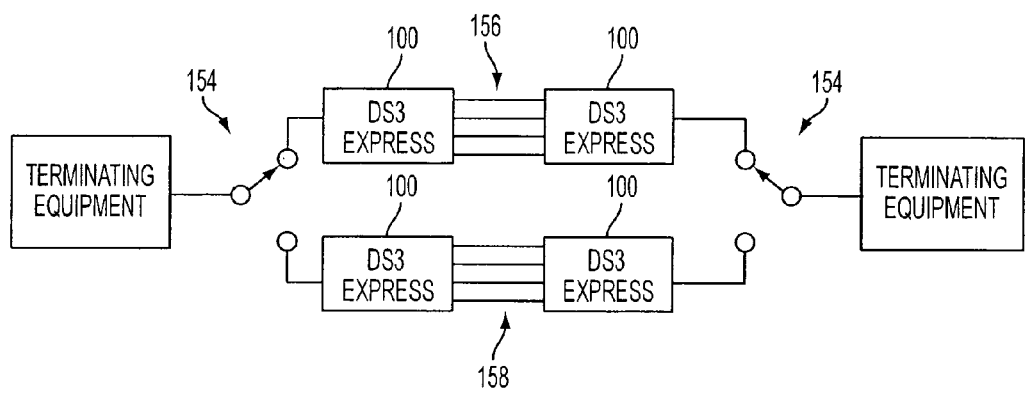
FIG. 3 is an illustration of a system according to an embodiment of the present invention in a redundant configuration.

Redundant application of embodiments of the present invention will now be described with reference to FIG. 3. It is important that DS3 service not be interrupted. However, outdoor wiring is subject to being broken by falling trees, ice storms, corrosion, and so on. Also, an underground cable can be broken by a backhoe or even a simple shovel, among other things.

Embodiments of the present invention advantageously have the ability to support a redundant implementation. The number of twisted pair required is increased to eight pairs. The DS3 at each end is a shared interface. Because DS3 signals will not tolerate a double termination or bridging, the DS3 signal must be routed to only one of the end units at a time, as illustrated in FIG. 3. Thus, relays 154 or other switching mechanisms in the chassis will route the DS3 signals to the appropriate end unit 100. Thus, if one set of twisted pair 156 becomes damaged or broken, the switches at either end route the DS3 signal to the backup set of twisted pair 158 through the corresponding end units 100. The chassis preferably includes communication links between the units to permit the switch to protect operation.

Figure 4:
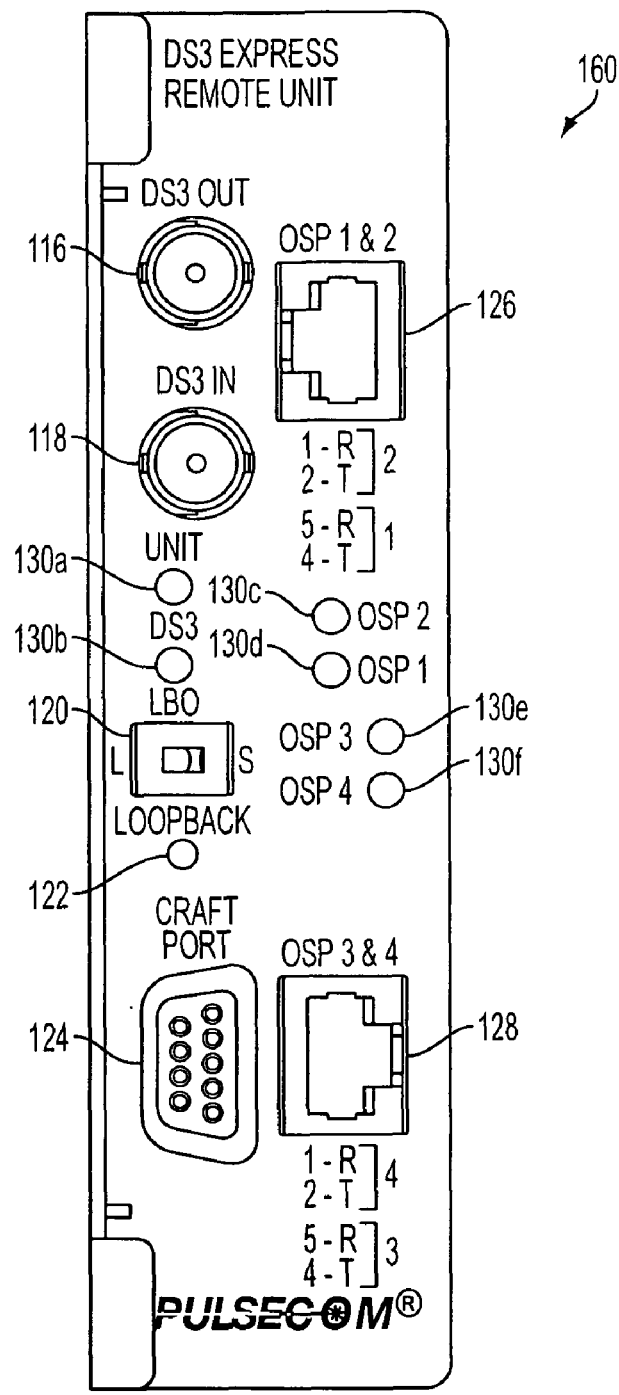
FIG. 4 is a front panel of a device according to an embodiment of the present invention.

One embodiment exemplified in FIG. 4 has DS3 interface 116 and DS3 interface 118 on front of the unit for use in applications such as remote telephone company enclosures. These connections automatically switch to the chassis to be controlled by relays 154 or other switching mechanisms for redundant implementations and communication with a neighboring unit.

One embodiment utilizes 1:1 protection switching so that identical end units 100 may be utilized as standby units as contrasted with other methods whereby more than one unit 100 and separate control circuitry are used to provide protection switching. The preferred embodiment thereby offers smaller size, less complexity and requires fewer units to provide protection switching.

This embodiment of the present invention is a module, approximately 5.75"×5.25"×1.5". It is comprised of three circuit boards. Two of the circuit boards contain the modems. The remaining board, with an edge finger connector, contains the power supply, microprocessor, DS3 interface 102, DS3 framers 114a, 114b, multiplexer 104, and inverse multiplexer 104. The DS3 framers 114a, 114b, the multiplexer 104, and the inverse multiplexer 104 are preferably implemented within a single field programmable gate array (FPGA).

FIG. 4 illustrates a front panel 160 of an end unit 100 according to an embodiment of the invention. Two BNC connectors 116, 118 provide the interface for the DS3 port. A switch 120 below the BNC connectors allows the user to select the line build out for the DS3 as either long or short. A short build out is preferably used for lines less than 225 feet and the long build out is intended to be used with cable 255-450 feet.

A pushbutton 122 below the build out switch preferably allows the user to place the unit in loopback manually. The 9 pin D connector 124 carries a serial port which can be accessed from a computer. In this embodiment, the user can view the status of the unit and past history of performance in 15 minute blocks up to one day. There is also preferably a seven day history in one day blocks. The user can view Errored Seconds, Severely Errored Seconds, Loss of Signal Seconds, and Line Code Violations for the DS3 interface. Data is collected for each OSP interface: Failure Counter, Reed-Solomon Error counter, Errored Seconds, Severely Errored Seconds, and Loss of Signal Seconds. The two square connectors 126, 128 on the front panel are preferably type RJ45. Each RJ45 will interface to 2 twisted pairs.

This embodiment also includes six LED's 130a-130f on the front panel 160. The front panel LED's provide the user with basic status information which can be used to troubleshoot most problems encountered without additional equipment. One LED is a unit LED 130a, which provides status information on the unit 100. When power is applied to the unit 100, but there is a failure, the unit LED 130a turns red. Green indicates that power is applied and the unit 100 is functioning properly. In a redundant application as described above, green indicates that the unit 100 is in active mode. If the unit 100 is in a redundant application, but is in standby mode, the unit LED 130a turns yellow.

Another LED in this embodiment is the DS3 LED 130b. The DS3 LED turns red to indicate a failure at the DS3 interface. Yellow indicates that a remote alarm has been received. Flashing green indicates that the unit is in DS3 loopback mode, and solid green indicates normal operation. A DS3 remote alarm can be either an AIS, IDLE, or RDI receives at the DS3 port. A DS3 failure includes loss of signal (LOS) or loss of DS3 framing.

This embodiment also includes four OSP LED's 130c-130f. For each of these LED's, red indicates no signal, and green indicates that a signal is present and that the link is synchronized.

Figure 5A:
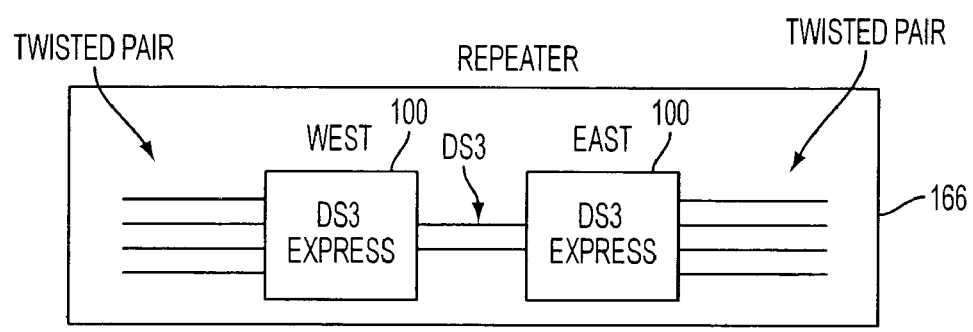
FIGS. 5a and 5b illustrate various repeater configuration options for devices according to an embodiment of the present invention.
Figure 5B:
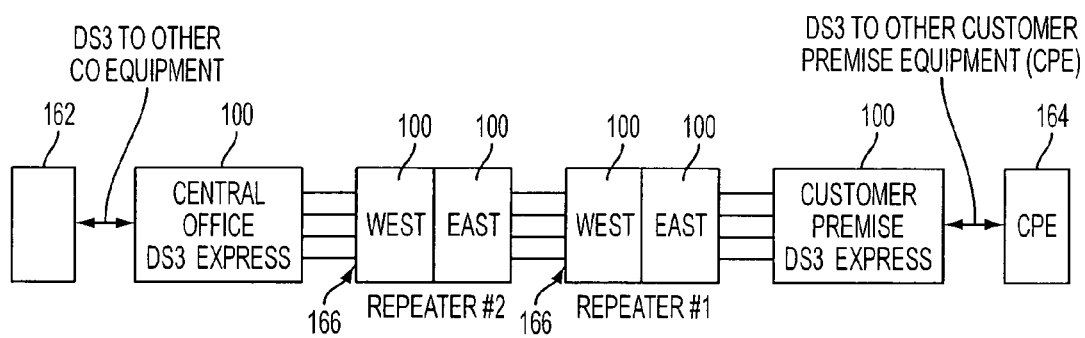

FIGS. 5a and 5b illustrate embodiments of the present invention used in repeater configurations representative of typical telephone company applications. FIG. 5a illustrates a basic repeater 166 arrangement. Two end units 100 are connected to each other through the DS3 interface. In this diagram, "West" refers to the end of the communication line closest to a Central Office (CO) 162. "East" refers to the end of the communication line closest to the customer premises equipment (CPE) 164. Thus, in a repeater arrangement as shown in FIG. 5a, the "West" end unit 100 is closest to the CO, and the "East" end unit 100 is closest to the customer premises equipment.

FIG. 5b illustrates several end units arranged in a double repeater 166 arrangement. Each repeater 166 is comprised of a West end unit 100 and an East end unit 100, with the end units 100 connected together through their respective DS3 interfaces. Repeater #1 166 is closest to the customer premises equipment, and repeater #2 166 is closest to the CO.

Also shown in FIG. 5b, there are end units 100 at the terminating ends of each set of twisted pair conductors at the CO and CPE.

In order to function optimally, the end units 100 must be configured such that they function as part of a repeater or not. Referring to FIG. 5b, the end units 100 at the CO 162 and at the CPE 164 are not configured as repeaters. End units that are configured as repeaters are further configured as West end units or East end units, as appropriate.

Figure 6:
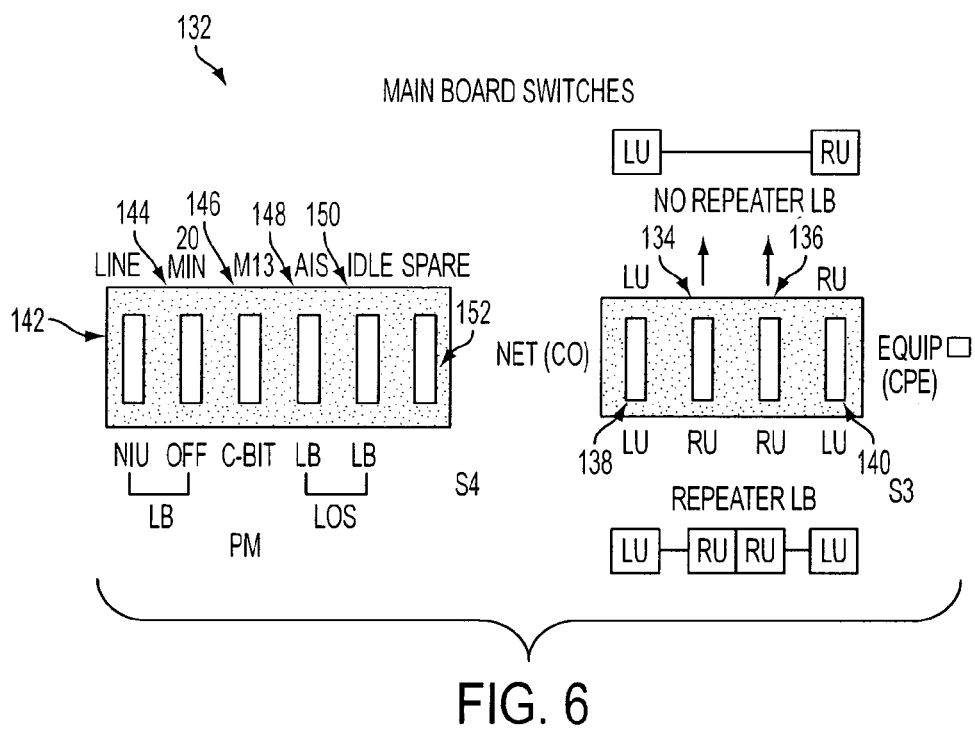
FIG. 6 illustrates exemplary switches for a device according to an embodiment of the present invention.

Provisioning of the unit is preferably accomplished through a set of switches 132 on the main board. An exemplary switch arrangement 132 is illustrated in FIG. 6. The four switches at the left are used to indicate the exact position of the end unit 100 in the network. Using the repeater arrangement shown in FIG. 5b as an example, the end units 100 at the CO and the Customer Premise are not repeaters, so switches 134, 136 labeled "NO REPEATER" should be in the up position. The NET (CO) end unit 100 should have the "Line Unit" (LU) switch 138 in the up position and the "Remote Unit" (RU) switch 140 in the down position. The EQUIP (CPE) end unit 100 should have the LU switch 138 in the down position and the RU switch 140 in the up position.

The repeaters 166 must have either switch 134 or switch 136 in the up position to indicate which repeater the end unit 100 is a member of. The LU switch 138 also acts as a "West" switch in the case of a repeater, and is in the up position to indicate that the end unit 100 is the West end unit of the particular repeater. The RU switch 140 acts as an "East" switch in the case of an end unit 100 that is a member of a repeater, and is in the up position to indicate that the particular end unit 100 is the East end unit.

With the switch arrangement as described above, each end unit 100 in the chain is configured according to its position in the network. Therefore, end units 100 according to an embodiment of the present invention are capable of responding to the loopback code in the appropriate way. It is assumed that equipment at the customer premise other than the end unit 100 will respond to a loopback code when the loopback code is first issued. All end units 100 in the chain will preferably ignore the first loopback code for that reason. The end unit 100 at the customer premise will respond to the $2^{nd}$ consecutive loopback code without an intervening loop down code. Repeater #1 east will respond to the $3^{rd}$ loopback code. Repeater 1 west will respond to the $4^{th}$ loopback code. Repeater 2 east will respond to the $5^{th}$ loopback code. Repeater 2 west will respond to the $6^{th}$ loopback code. Finally, The NET (CO) end unit 100 will respond to the $7^{th}$ consecutive loopback code without an intervening loop down code. In this manner, each link in the repeater chain can advantageously be tested in turn. Of course, it will be understood that if loopbacks are not performed in the system, the setting of the first four switches is not important.

Referring to the second set of switches, two of these switches are also concerned with loopback. As mentioned described herein, the end unit 100 will respond to two different loopback codes, the DS3 LINE loopback and the NIU loopback. One switch 142 selects which code will cause the end unit 100 to enter loopback. Also, there is preferably a 20 minute timer associated with the loopback. If the timer is enabled, any loopback which has been in effect for 20 minutes will be released. If the timer is OFF, a loopback can remain in effect indefinitely. Switch 144 selects whether the 20 minute timer release function is enabled or not.

Selection switch 146 configures the end unit 100 for either M13 or C-BIT framing pattern in the DS3 signal. The end unit 100 supports both the older M13 framing pattern or the C-Bit- Parity framing pattern which permits loopback commands to be embedded in the signal overhead.

Two switches 148, 150 allow the user to program the response of the end unit to a loss of signal. The end unit will preferably respond in one of three ways. First, an AIS signal will be transmitted if AIS switch 148 is in the up position. An IDLE signal will be transmitted if IDLE switch 150 is in the up position. Finally, the end unit 100 preferably enters loopback mode if the AIS switch 148 and IDLE switch 150 are both in the down position until the input signal is regained. Finally, in this example, a spare switch 152 is provided to allow for expanded capabilities.

The functionality of an end unit 100 according to an embodiment of the invention will now be described in further detail. A DS3 input signal is demultiplexed into four modulated signals at 12.96 Mbps each. Conversely, there are four modulated inputs at 12.96 Mbps each that are remultiplexed into a single DS3 for transmission. The end unit 100 transmits and receives simultaneously on all twisted pairs. The upstream and downstream data is divided into separate frequency bands. This requires two different sets of filters to be implemented. A Network Unit device (farthest "west" or towards the CO) will use the low frequency band for transmit and the high frequency band for receive. The Remote Unit device will use the high band for transmit and the low band for receive.

The transmit high band filter has a different characteristic than the receive high band filter. Also, the transmit low band filter has a different characteristic than the receive low band filter. Therefore, in one embodiment, only the required filters are included in a particular end unit 100, depending on whether it is a Network Unit (towards the CO) or a Remote Unit (towards the CPE). As a result, end units according to one embodiment of the invention can be kept smaller because they do not include unnecessary extra filters as would be needed in a device capable of functioning either as a Network Unit or as a Remote Unit. Alternately, the end unit 100 can be populated with all filters, and configured to select the ones needed for the application using switches. In this embodiment, the processor is programmed to function as either a Network Unit or a Remote Unit, but only the appropriate filters are included. A zero ohm jumper is used to indicate to the processor whether the device is a Network Unit or a Remote Unit.

The DS3 signal received from the DS3 interface at the left of the block diagram is framed. If a loss of frame or a loss of signal is detected for 2.5 seconds, the alarm insertion logic will inject the AIS toward the modem interface 106 through Alarm Insertion Unit 115a. The DS3 framer 114b which receives data from the modem side, can also cause the AIS to be sent to the DS3 side after a 2.5 second soaking period. If any of the four modem links 106a-106d experiences a receive problem such as loss of signal or loss of synchronization, the DS3 Alarm Insertion Device 115b will inject an AIS toward the DS3 port after a 2.5 second soaking period.

The modem interfaces preferably have a remote defect indication mechanism. If a modem input is lost, the remote defect indication is sent to the far end. The alarm contacts are divided as either remote or local alarm. A local alarm is a loss of received signal from either the DS3 or any of the modem ports. The second contact closure indicates remote alarms. If the AIS, IDLE, or RDI is detected on either incoming directions, the remote alarm contact is closed. The modem remote defect indication that will close the remote alarm contact.

The multiplexing operation will divide the DS3 into four streams. Each modem stream will accept every fourth bit from the DS3. This results in four parallel data streams at 11.184 Mbps. With added overhead, the modem streams carry 12.96 Mbps. In this embodiment, a 260 byte packet is generated. Two bytes are used for synchronization, three are control bytes, and 16 bytes are used for Reed Solomon error correction. 236 bytes carry information, resulting in a 90.77% efficiency and 11.76 Mbps of capacity. In order to be able to reconstruct the DS3 stream at the far end, additional structure and overhead is included in each stream. Each ¼ DS3 stream is placed into 64 byte (512 bit) packets by the framer 105. The first byte is a fixed framing pattern allowing the receiver to find the start of the packet. The second byte has a four bit packet number and two bit stream number which is used at the receiver to join four packets from the four corresponding modem streams together to form a DS3 stream. The packet number is incremented as each packet is sent. The packets enter the four transmitters simultaneously. Variable delays in the transmitters and receivers will cause some skew in the data as it passes through the modems and twisted pair portion of the system.

The inverse multiplexer, at the receiver, buffers the packets, and aligns the data by matching the four bit packet numbers and arranging data according to the two bit stream number. The remaining two bits of the $2^{nd}$ byte are used in the packet control stuffing. 62 bytes of the 64 byte packet are the actual data. The system has 11.39 Mbps of data capacity compared to the 11.184 Mbps of capacity which is required. If 61 of the 62 information bytes are used, the resulting data rate is 11.21 Mbps which is very close to the nominal rate. Using 60 of the 62 data bytes, the data rate is only 11.03 Mbps. The inverse multiplexer function will vary the number of used data bytes in the 64 byte packet. In this embodiment, 61 bytes per packet would have valid data with an occasional packet that contained only 60 valid data bytes. There could be a case where the DS3 is running faster than nominal, and the modem link is running slower than nominal, resulting in the need for an occasional 62 byte information packet. The remaining two bits in the $2^{nd}$ packet byte control this stuffing. Table 1 contains exemplary stuffing codes, and the corresponding number of valid information bytes carried in a packet.

TABLE 1

| Stuffing code | Valid information bytes |
| --- | --- |
| 00 | 59 |
| 01 | 60 |
| 10 | 61 |
| 11 | 62 |

Although a 59 packet is unlikely to be needed, it is specified to insure that the unusual code (perhaps created by an error in the transmission path) does not create some unexpected, disruptive behavior. Table 2 illustrates the structure of the 64 byte packet generated for each modem data stream according to an embodiment of the invention.

TABLE 2

| 64 byte packet | | |
| --- | --- | --- |
| Sync Code | 11010100 | |
| Packet Number | 4 bits (counter 0-15) | Single byte |
| Stream number | 2 bits (1 of 4 streams) | |
| Stuffing code | 2 bits (59-62 valid data bytes) | |

TABLE 2-continued

| | 64 byte packet |
|---|---|
| Information | 59 data bytes always valid |
| Stuff byte | Valid if stuff code ≧ 01 |
| Stuff byte | Valid if stuff code ≧ 10 |
| Stuff byte | Valid if stuff code = 11 |

Alternately, a rotating packet index number can be generated at the transmit end and included packet header to assist in reassembling the data streams into a DS3 signal at the receive end. Preferably, the packet index number is a four bit field that rotates through values 0000 through 1111. Each sequential packet at the receive end is transmitted on the next available twisted pair port. At the receive end, groups of sixteen packets are reassembled in order, according to the packet index numbers.

While the invention herein disclosed has been described by means of specific embodiments and applications thereof, numerous modifications and variations can be made thereto by those skilled in the art without departing from the scope of the invention as set forth in the claims.

What is claimed is:

1. A system for transmitting a DS3 data stream over a few twisted pair conductors comprising:
   a high speed data interface configured to receive said DS3 data stream and to inversely multiplex said high speed data stream into four parallel data streams that each comprise an approximately 11 megabits per second stream (Mbps),
   a framer configured to receive each of said parallel data streams, and to generate a stream of packets, each packet having a packet index number and a packet stream number corresponding to its respective said parallel data stream, and
   a plurality of modems configured to modulate each corresponding stream of packets having a data rate of approximately 13 Mbps onto a twisted pair conductor.

2. The system of claim 1, wherein each parallel data steam is placed into a 64 byte, 512 bit packet comprising a framing byte to facilitate location of the beginning of the packet at a receiver, a second byte comprising the packet index number and the packet stream number to facilitate the joining of four packets from the four parallel data streams to form a DS3 stream at a receiver, the packet index number being incremented as each packet is sent on a twisted pair conductor, and remaining bytes being information bytes that comprise data from the DS3 stream.

3. The system of claim 2, wherein said second byte comprises stuffing bits to allow the inverse multiplex operation of said high speed data interface to vary the number of bytes in a packet.

4. The system of claim 1, wherein said bits of said DS3 data stream are directed to said plurality of parallel data streams in accordance with a round robin pattern.

5. The system of claim 1, wherein said modems are configured to modulate data into one of a high frequency band or a low frequency band based on a transmit direction.

6. A system for transmitting a high speed data stream over a plurality of twisted pair conductors comprising:
   a high speed data interface configured to receive said high speed data stream and to inversely multiplex said high speed data stream into a plurality of parallel data streams,
   a framer configured to receive one of said parallel data streams, and to generate a stream of packets, each packet having a packet index number,
   a plurality of modems configured to modulate each corresponding stream of packets onto a twisted pair conductor; and
   a processor configured to identify a loopback code in said high speed data stream, wherein said processor is further configured to pass through a first received loopback code to another device, and to enter a loopback mode if an $n^{th}$ subsequent loopback code is received without an intervening loop down code.

7. An apparatus for transmitting a high speed data stream over a plurality of twisted pair conductors comprising:
   a high speed data interface configured to receive said high speed data stream and to inversely multiplex said high speed data stream into a plurality of parallel data streams,
   a framer configured to receive one of said parallel data streams, and to generate a stream of packets, each packet having a packet number and stream identifier,
   a plurality of modems configured to modulate each corresponding stream of packets onto a twisted pair conductor, and
   at least one switch enabled to configure said apparatus as a repeater unit or a non-repeater unit, said apparatus being operable as a repeater when said high speed data interface thereof is connected to a second said high speed data interface of a second said apparatus to allow a high speed data stream to pass between the two said high speed data interfaces and data streams to be transmitted to and received from said plurality of modems of each of said apparatus and said second apparatus via twisted pair conductors, wherein, in each of said apparatus and said second apparatus, said plurality of modems demodulates a plurality of parallel signals received over said twisted pair conductors into a plurality of data streams each comprising a stream of packets, each said packet having a corresponding said stream identifier and said packet number, a deframer receives said parallel streams of packets and synchronizes said packets from said parallel streams based on said stream identifiers and said packet numbers, and said high speed data interface receives said plurality of synchronized parallel data streams and multiplexes said plurality of parallel data streams into a high speed data stream.

8. The apparatus of claim 7, wherein said at least one switch is further enabled to configure said apparatus as a west (LU) or east (RU) repeater unit, said west (LU) repeater unit being closest to a central office and said each (RU) repeater unit being closest to customer premises equipment.

9. The apparatus of claim 7, wherein said at least one switch is further enabled to configure said system as a first repeater or a second repeater unit.

10. The apparatus of claim 7, further comprising a front panel having a high speed data stream interface, and a rear interface, said system being configured to switch between said front panel interface and said rear interface based on a user input.

11. The apparatus of claim 10, wherein said user input is an information bit in a back plane.

12. The apparatus of claim 7, wherein said apparatus is configured to perform 1:1 protection switching and said apparatus is a redundant, non-repeater unit, said processor being further configured to switch between an active mode, and a standby mode for protection switching.

13. The apparatus of claim 7, further comprising an LED for displaying a loss of signal status.

14. The apparatus of claim 7, further comprising an LED for displaying a loopback mode status.

15. The apparatus of claim 7, further comprising an LED for displaying a remote alarm status.

16. The apparatus of claim 7, further comprising an LED for displaying a normal operation status.

17. The apparatus of claim 7, further comprising an LED for displaying a standby mode status.

18. The apparatus of claim 7, further comprising an LED for displaying a system failure status.

19. The apparatus of claim 7, further comprising an LED for displaying a status of one of said plurality of parallel data streams.

20. The apparatus of claim 19, further comprising a plurality of LED's for displaying a loss of signal status corresponding to each of said plurality of parallel data streams.

21. The apparatus of claim 7, wherein said apparatus and said second apparatus are configured to operate as a first said repeater connected to a second said repeater, said second repeater comprising a third said apparatus and a fourth said apparatus having their corresponding said high speed data interfaces connected to each other and configured to operate as said second repeater, said high speed data interface, said framer and said plurality of modems in each of said apparatus and said third apparatus being configured to process a DS3 stream to modulate each said parallel data stream inversely multiplexed therefrom as said corresponding said steam of packets onto a twisted pair conductor having a data rate of approximately 13 Mbps used over a maximum range of approximately 2,300 feet.

22. The apparatus of claim 21, wherein said at least one switch is further enabled to configure said apparatus as a west (LU) repeater unit closest to a central office or a east (RU) repeater unit closest to customer premises equipment.

23. The apparatus of claim 22, wherein said at least one switch is further enabled to configure said apparatus as operable in said first repeater or said second repeater.

24. The apparatus of claim 7, wherein said repeater is connected to a third said apparatus, said repeater is closer to a test unit and a central office than said third apparatus which is downstream and closer to customer premises equipment, said repeater and said third apparatus each being configurable to selectively pass through a received loopback code and selectively enter a loopback mode when a selected $n^{th}$ loopback is received without an intervening code, said third apparatus being programmed to respond to a first loopback code and said apparatus and said second apparatus in said repeater being programmed to ignore and pass through said first loopback code and to enter a loopback mode when a second subsequent loopback code is received.

25. A system for receiving a DS3 data stream over a few twisted pair conductors comprising:

a plurality of modems configured to demodulate a few parallel signals received over respective ones of four twisted pair conductors that each comprise an approximately 13 megabits per second (Mbps) stream into a few data streams each comprising a stream of packets, each packet having a stream identifier corresponding to its respective one of the parallel signals and a packet index number;

a deframer configured to receive said parallel streams of packets, and to synchronize packets from said parallel streams based on said stream identifiers and said packet numbers; and a high speed data interface configured to receive said plurality of synchronized parallel data streams and to multiplex said plurality of parallel data streams into said DS3 data stream.

26. The system of claim 25, wherein said bits of said DS3 data stream are obtained from said few parallel data streams in accordance with a round robin pattern.

27. The system of claim 25, wherein each of said plurality of synchronized parallel data steams has a data rate of approximately 11 Mbps.

28. A system for receiving a high speed data stream over a plurality of twisted pair conductors comprising:

a plurality of modems configured to demodulate a plurality of parallel signals received over said plurality of twisted pair conductors into a plurality of data streams each comprising a stream of packets, each packet having a stream identifier and a packet number;

a deframer configured to receive said parallel streams of packets, and to synchronize packets from said parallel streams based on said stream identifiers and packet numbers;

a high speed data interface configured to receive said plurality of synchronized parallel data streams and to multiplex said plurality of parallel data streams into said high speed data stream; and a processor configured to identify a loopback code in said high speed data stream, wherein said processor is further adapted to pass through a first received loopback code to another device, and to enter a loopback mode if an $n^{th}$ consecutive loopback code is received without an intervening loop down code.

29. A method of transmitting a DS3 data stream over a few twisted pair conductors comprising:

receiving said DS3 data stream;

inversely multiplexing said DS3 data stream into a four parallel data streams that each comprise an approximately 11 megabits per second (Mbps) stream;

generating a stream of packets from each said parallel data stream, each packet having a stream identifier corresponding to its respective said parallel data stream and a packet number, and modulating each corresponding one of the four streams of packets onto a corresponding twisted pair conductor having a data rate of approximately 13 Mbps.

30. The method of claim 29, wherein said bits of said DS3 data stream are directed to said plurality of parallel data streams in accordance with a round robin pattern.

31. The method of claim 29, further comprising determining from said stream identifier received from each of a plurality of the four streams transmitted on respective twisted pair conductors that a miswire condition exists between at least two of the twisted pair conductors.

32. The method of claim 29, wherein said modulating step further comprises modulating data into one of a high frequency band or a low frequency band based on a transmit direction.

33. A method of transmitting a high speed data stream over a plurality of twisted pair conductors comprising:

receiving said high speed data stream;
inversely multiplexing said high speed data stream into a plurality of parallel data streams,
generating a stream of packets from each said parallel data stream, each packet having a stream identifier and a packet number,
modulating each corresponding stream of packets onto a corresponding twisted pair conductor,
identifying a loopback code in said high speed data stream, and
passing through a first received loopback code to another device and entering a loopback mode if an $n^{th}$ consecutive loopback code is received without an intervening loop down code.

* * * * *